(12) United States Patent
Li et al.

(10) Patent No.: US 11,194,430 B2
(45) Date of Patent: Dec. 7, 2021

(54) TOUCH DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Bo Li, Wuhan (CN); Yimei Zhang, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 300 days.

(21) Appl. No.: 16/488,448

(22) PCT Filed: Apr. 12, 2019

(86) PCT No.: PCT/CN2019/082507
§ 371 (c)(1),
(2) Date: Aug. 23, 2019

(87) PCT Pub. No.: WO2020/172960
PCT Pub. Date: Sep. 3, 2020

(65) Prior Publication Data
US 2021/0333932 A1      Oct. 28, 2021

(30) Foreign Application Priority Data

Feb. 27, 2019   (CN) .................... 201910145876.8

(51) Int. Cl.
*G06F 3/044*        (2006.01)

(52) U.S. Cl.
CPC .......... *G06F 3/0443* (2019.05); *G06F 3/0446* (2019.05); *G06F 2203/04105* (2013.01);
(Continued)

(58) Field of Classification Search
None
See application file for complete search history.

(56) References Cited

U.S. PATENT DOCUMENTS

| 2013/0257786 | A1* | 10/2013 | Brown | G06F 3/04182 345/174 |
| 2018/0224965 | A1* | 8/2018 | Church | G06F 3/0443 |
| 2019/0114001 | A1* | 4/2019 | Mugiraneza | G01L 5/00 |

FOREIGN PATENT DOCUMENTS

CN         106855756 A  *  6/2017  .......... G06F 3/0412

* cited by examiner

*Primary Examiner* — Duane N Taylor, Jr.
(74) *Attorney, Agent, or Firm* — Benesch, Friedlander, Coplan & Aronoff LLP

(57) ABSTRACT

A touch display device includes a cover plate, a touch display module, a substrate, a liner layer disposed on the substrate, a first transparent substrate disposed on the liner layer, a second transparent substrate disposed on the liner layer, a touch driving electrode and a touch sensing electrode. The touch driving electrode is disposed on the first transparent substrate, and the touch sensing electrode is disposed on the second transparent substrate. A capacitance between the touch driving electrode and the touch sensing electrode is varied to perform touch sensing when the touch display device is applied. A distance between the touch driving electrode and the touch sensing electrode is varied perform pressure sensing when a certain pressure is applied to the touch driving electrode.

18 Claims, 4 Drawing Sheets

(52) U.S. Cl.
CPC .............. *G06F 2203/04107* (2013.01); *G06F 2203/04111* (2013.01)

TOUCH DISPLAY DEVICE

CROSS REFERENCE TO RELATED APPLICATION

This application claims the priority of International Application No. PCT/CN2019/082507, filed on 2019 Apr. 12, which claims priority to Chinese Application No. 201910145876.8 filed on 2019 Feb. 27. The entire disclosures of each of the above applications are incorporated herein by reference.

BACKGROUND OF INVENTION

Field of Invention

The present invention relates to a touch display device, and more particularly, to a touch sensing device integrated with a pressure sensor and a touch sensor.

Description of Prior Art

Currently, touch display devices having a pressure sensing function are implemented by attaching a pressure sensor on external touch display devices. A conventional pressure sensor includes two circuit boards, and an elastic layer disposed between the two circuit boards. When an external force is applied to the pressure sensor, the elastic body is deformed. Thus, a capacitance value between the two circuit boards varies. When a chip senses variation of the capacitance value, the corresponding feedback response will be directly made.

SUMMARY OF INVENTION

Overall thickness of a touch display device is increased due to attaching a pressure sensor on the external touch display device. Total manufacturing cost is also increased.

In view of this, a touch display device integrated with a pressure sensor and a touch sensor is provided to solve the problems existing in the prior art.

According to one embodiment of the present invention, a touch display device is provided. The touch display device includes a substrate, a liner layer disposed on the substrate, a first transparent substrate disposed on the liner layer, a second transparent substrate disposed on the liner layer, a touch electrode, a pressure sensor, and a touch sensor. The touch electrode includes a touch driving electrode and a touch sensing electrode, and the touch driving electrode is disposed on the first transparent substrate, and the touch sensing electrode is disposed on the second transparent substrate. A capacitance between the touch driving electrode and the touch sensing electrode is varied to perform touch sensing when the touch display device is applied. One of the first transparent substrate and the second transparent substrate is patterned. The first transparent substrate and the second transparent substrate move to each other to change a distance between the touch driving electrode and the touch sensing electrode when a certain pressure is applied to the touch display device, and the capacitance between the touch driving electrode and the touch sensing electrode is varied to perform pressure sensing.

In one embodiment of the present invention, the touch display device further includes a cover plate and a touch display module.

In one embodiment of the present invention, the first transparent substrate is a patterned first transparent substrate and the patterned first transparent substrate includes a plurality of cylindrical bodies.

In one embodiment of the present invention, the second transparent substrate is a patterned second transparent substrate, and the patterned first transparent substrate includes a plurality of cylindrical bodies.

In one embodiment of the present invention, the first transparent substrate and the second transparent substrate each are made of polyimide.

In one embodiment of the present invention, the liner layer includes silicon dioxide.

In one embodiment of the present invention, the touch display device includes an insulating layer, a metal bridge, and an organic protective layer, and the insulating layer includes silicon nitride or silicon oxide.

In one embodiment of the present invention, the insulating layer is disposed above the touch driving electrode and the touch sensing electrode, the metal bridge is disposed above the insulating layer, and an organic protective layer is disposed above the metal bridge and covers the insulating layer.

In one embodiment of the present invention, the metal bridge connects with an adjacent touch driving electrode.

In one embodiment of the present invention, there is a predetermined distance between the touch driving electrode and the touch sensing electrode.

According to one embodiment of the present invention, a touch display device is provided. The touch display device includes a substrate, a liner layer disposed on the substrate, a first transparent substrate disposed on the liner layer, a second transparent substrate disposed on the liner layer, a touch electrode, a pressure sensor, and a touch sensor. The touch electrode includes a touch driving electrode and a touch sensing electrode, and the touch driving electrode is disposed on the first transparent substrate, and the touch sensing electrode is disposed on the second transparent substrate. A capacitance between the touch driving electrode and the touch sensing electrode is varied to perform touch sensing when the touch control is performed. The liner layer includes silicon dioxide. One of the first transparent substrate and the second transparent substrate is patterned, and the first transparent substrate and the second transparent substrate move to each other to change a distance between the touch driving electrode and the touch sensing electrode when a certain pressure is applied to the touch display device, and the capacitance between the touch driving electrode and the touch sensing electrode is varied to perform pressure sensing. The first transparent substrate and the second transparent substrate each are made of polyimide.

In one embodiment of the present invention, the touch display device further includes a cover plate and a touch display module.

In one embodiment of the present invention, the first transparent substrate is a patterned first transparent substrate, and the patterned first transparent substrate includes a plurality of cylindrical bodies.

In one embodiment of the present invention, the second transparent substrate is a patterned second transparent substrate, and the patterned first transparent substrate includes a plurality of cylindrical bodies.

In one embodiment of the present invention, the touch display device further includes an insulating layer, a metal bridge, and an organic protective layer, and the insulating layer includes silicon nitride or silicon oxide.

In one embodiment of the present invention, the insulating layer is disposed above the touch driving electrode and the touch sensing electrode, the metal bridge is disposed above the insulating layer, an organic protective layer is disposed above the metal bridge and covers the insulating layer.

In one embodiment of the present invention, the metal bridge connects to adjacent touch driving electrode.

In one embodiment of the present invention, there is a predetermined distance between the touch driving electrode and the touch sensing electrode.

The touch display device provided by the embodiments of the present invention can simultaneously detect the pressure and a touch action, and it does not need to have a pressure sensing module. A total manufacturing cost is reduced, and a thickness of the touch display device is reduced, too. Therefore, quality and function of the touch display device are improved, and a touch sensing device integrated with a pressure sensor and a touch sensor is achieved.

DETAILED DESCRIPTION OF PREFERRED EMBODIMENTS

In order to make the present invention more comprehensible, the preferred embodiments are described below in detail with reference to the accompanying drawings.

In one embodiment, a touch display device is provided. The touch display device includes a cover plate, a touch display module, a substrate, a liner layer disposed on the substrate, a first transparent substrate disposed on the liner layer, a second transparent substrate disposed on the liner layer, a touch electrode, a pressure sensor, and touch sensor. The touch electrode includes a touch driving electrode and a touch sensing electrode, and the touch driving electrode is disposed on the first transparent substrate, and the touch sensing electrode is disposed on the second transparent substrate, and the pressure sensor and the touch sensor are connected to the touch electrode.

Figure 1:
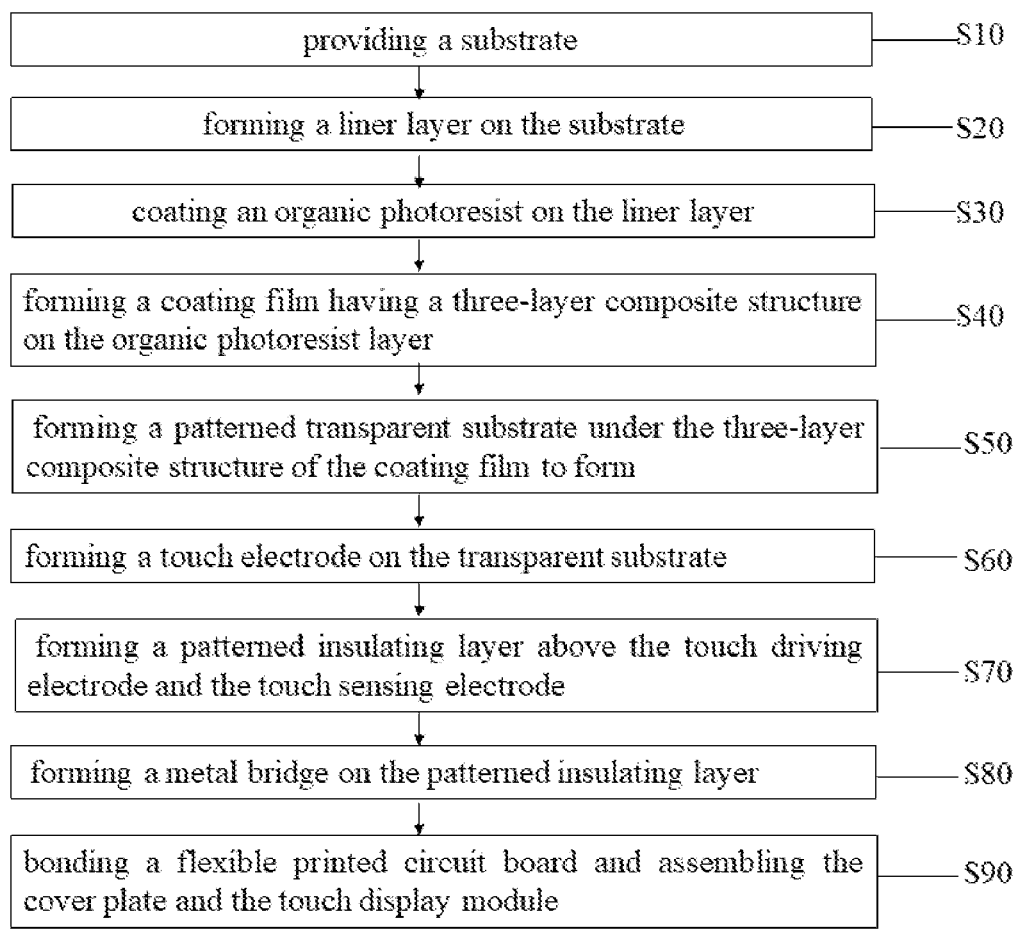
FIG. 1 is a flowchart of manufacturing a touch display device according to one embodiment of the present invention.

FIG. 1 is a flow-chart of manufacturing a touch display device according to one embodiment of the present invention. First, a substrate is provided as shown in step S10. Next, a liner layer is disposed on the substrate as shown in step S20. The liner layer is used to function as a stress buffer layer, and the liner layer includes, but is not limited to, a silicon dioxide layer. Then, as shown in step S30, an organic photoresist is coated on the liner layer to form an organic photoresist layer, and an exposure treatment and a curing treatment are performed. The curing treatment can prevent decomposition of material and gas release during subsequent processes. As shown in step S40, a coating film having a three-layer composite structure is formed on the organic photoresist layer, and the coating film having a three-layer composite structure includes an indium tin oxide layer, a metal layer, and an indium tin oxide layer. The coating film having the three-layer composite structure is patterned, and a patterning process includes steps of coating a photoresist, exposing, developing, etching, and stripping the photoresist. Next, as shown in step S50, developing the organic photoresist layer disposed under the three-layer composite structure of the coating film to form a patterned transparent substrate, and the patterned transparent substrate includes a plurality of cylindrical bodies. Furthermore, the patterned transparent substrate is an elastic cylindrical shape, and a material of the transparent substrate includes polyimide. The organic photoresist layer disposed under the three-layer composite structure of the coating film is cured to ensure the organic photoresist layer is completely cured. As shown in step S60, a touch electrode is formed on the transparent substrate, and the touch electrode includes a touch driving electrode and a touch sensing electrode, and the transparent substrate includes a first transparent substrate and a second transparent substrate, and the touch driving electrode and the touch sensing electrode are respectively formed on the first transparent substrate and the second transparent substrate. Optionally, the first transparent substrate may be a patterned first transparent substrate, and the second transparent substrate may be a non-patterned second transparent substrate. Similarly, the first transparent substrate may be a non-patterned first transparent substrate, and the second transparent substrate may be a patterned second transparent substrate. As shown in step S70, an insulating layer is formed above the touch driving electrode and the touch sensing electrode, and the insulating layer includes an organic material or an inorganic material, and the inorganic material includes but is not limited to silicon nitride or silicon oxide. Then, the insulating layer is processed by coating, exposing, developing, etching, and photoresist stripping to form a patterned insulating layer. As shown in step S80, metal bridge is formed by physical vapor deposition (PVD), exposing, developing, etching, and photoresist stripping on the patterned insulating layer, and the metal bridge is connected to the touch driving electrode and the touch sensing electrode. Next, an organic protective layer is formed above the insulating layer and the metal bridge. The organic protective layer is processed by exposing, developing or inkjet printing to form a patterned organic protective layer. The patterned organic protective layer protects a touch sensing circuit and completely covers the metal bridge and the insulating layer. Simultaneously, a signal output end of the touch sensing circuit is exposed to connect a flexible printed circuit board so as to output the touch signal. Finally, as shown in step S90, a flexible printed circuit board is bonded and assembled with the cover plate and the touch display module to achieve a touch sensing device integrated with a pressure sensor and a touch sensor.

Figure 2:
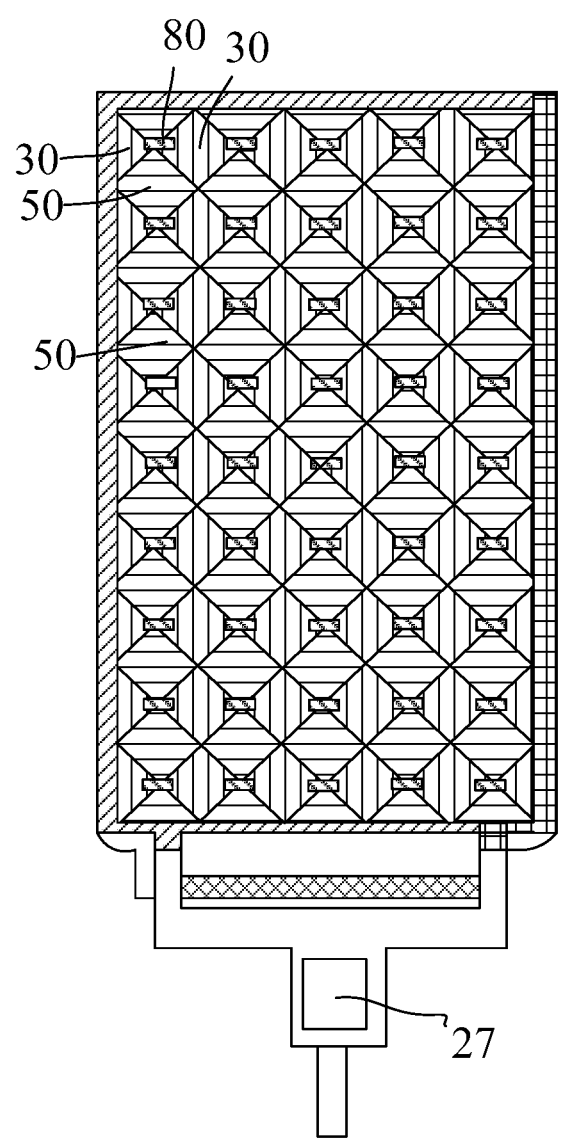
FIG. 2 is a schematic plan view of a touch display device according to a first embodiment of the present invention.

FIG. 2 is a schematic plan view of a touch display device 2 according to a first embodiment of the present invention. The touch display device 2 includes a touch driving electrode 30 and a touch sensing electrode 50 that are diamond-shaped structures. The touch driving electrodes 30 are arranged in a plurality of rows, and the touch sensing electrodes 50 are arranged in a plurality of columns. Each of two adjacent touch driving electrodes 30 in the plurality of rows is connected by a metal bridge 80. The touch display device 2 further includes a touch chip 27 for performing a touch feedback response to the touch sensing and a pressure feedback response to the pressure sensing.

Figure 3:
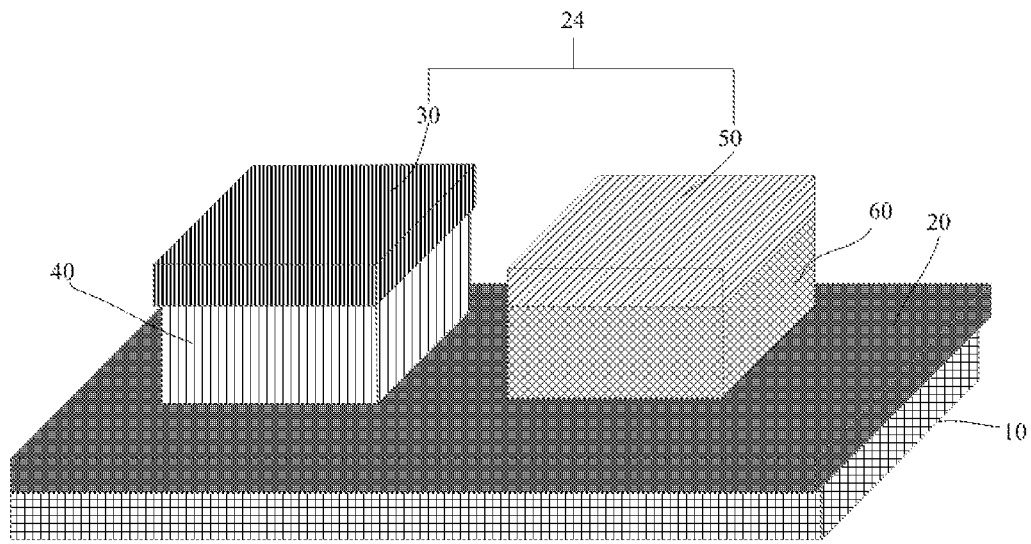
FIG. 3 is a partial enlarged schematic view of a three-dimensional structure of a touch display device according to the first embodiment of the present invention.

FIG. 3 is a schematic view of a three-dimensional structure of a touch display device according to the first embodiment of the present invention. The touch display device 2 includes a substrate 10. A liner layer 20 is disposed on the substrate 10 to serve as a stress buffer layer. A first transparent substrate 40 and a second transparent substrate 60 are disposed on the liner layer 20. A touch electrode 24 is disposed on the first transparent substrate 40 and the second transparent substrate 60. The touch electrode 24 includes a touch driving electrode 30 and a touch sensing electrode 50. The touch driving electrode 30 is disposed on a patterned first transparent substrate 40, and the touch sensing electrode 50 is disposed on a non-patterned second transparent substrate 60. The touch driving electrode 30 and the touch sensing electrode 50 are diamond-shaped structures. In another embodiment, the touch driving electrode 30 is disposed on the non-patterned first transparent substrate 40, and the touch sensing electrode 50 is disposed on the patterned second transparent substrate 60. In this regard, it is obvious to those skilled in the art to adjust the embodiment of the present invention.

Figure 4:
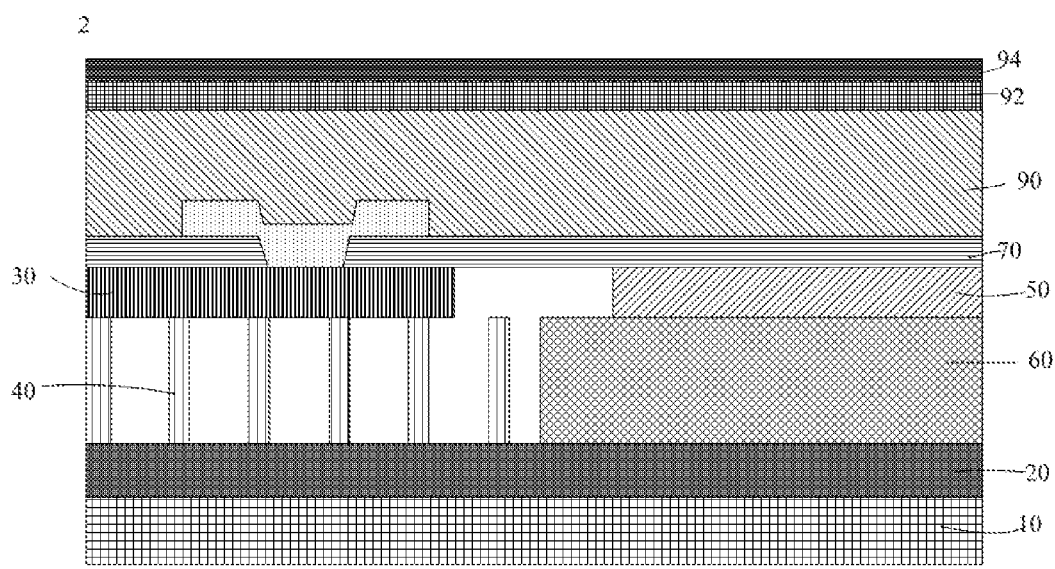
FIG. 4 is a partial enlarged cross-sectional view of a touch display device which is not deformed according to the first embodiment of the present invention.

FIG. 4 is a cross-sectional view of a touch display device which is not deformed according to the first embodiment of the present invention. The touch driving electrode 30 is disposed on the patterned first transparent substrate 40, and the touch sensing electrode 50 is disposed on the non-patterned second transparent substrate 60. The touch driving electrode 30 and the touch sensing electrode 50 are diamond-shaped structures. A patterned insulating layer 70 and the metal bridge 80 are disposed on the touch driving electrode 30 and the touch sensing electrode 50, and the metal bridge 80 is connected to adjacent touch driving electrode 30. The patterned organic protective layer 90 is disposed above the insulating layer 70 and completely covers the metal bridge 80 and the insulating layer 70. When the touch display device 2 is touched by a foreign object such as a user's finger or a stylus, a capacitance between the touch driving electrode 30 and the touch sensing electrode 50 is varied when touch control is performed. The capacitance is varied because of the foreign object touches the touch display device. A certain distance between the touch driving electrode 30 and the touch sensing electrode 50 is kept when the touch display device 2 is not deformed by a sufficient pressure on the touch display device 2. Thus, no pressure sensing occurs. At this time, the touch chip 27 is used for performing a touch feedback response to the touch sensing. The touch display device 2 further includes a cover plate 92 and a touch display module 94 disposed above the patterned organic protective layer 90.

Figure 5:
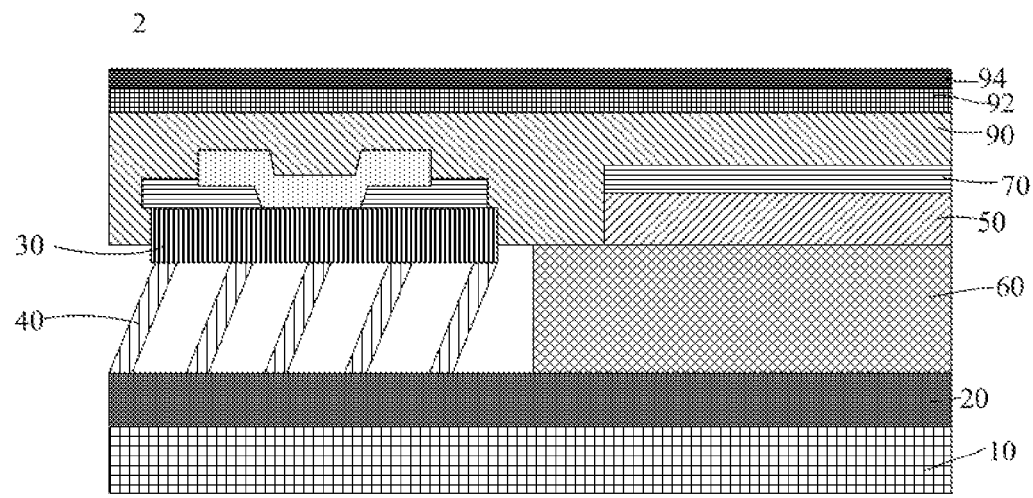
FIG. 5 is a partial enlarged schematic view of touch display device which is deformed by a pressure according to the first embodiment of the present invention.

FIG. 5 is a schematic view of touch display device 2 which is deformed by a pressure according to the first embodiment of the present invention. A certain pressure is applied to the touch display device 2, and the first transparent substrate 40 is sloped and deformed, so that a relative distance between the touch driving electrode 30 and the touch sensing electrode 50 is shortened, which results that a induced capacitance signal between the touch driving electrode 30 and the touch sensing electrode 50 is varied, and it is significantly different from another induced capacitance signal between the touch driving electrode 30 and the touch sensing electrode 50 when there is no external pressure applied to the touch display device 2.

When a touch control detects a variation of capacitance, a pressure feedback response is performed. At this time, the touch chip 27 performs not only a touch feedback response to the touch sensing and a pressure feedback response to the pressure sensing. When no pressure is applied to the touch control, for example, a user only touches the screen and does not press the screen, the patterned first transparent substrate 40 is not sloped and deformed, so that a relative distance between the touch driving electrode 30 and the touch sensing electrode 50 is not shortened. At this time, a distance between the touch driving electrode 30 and the touch sensing electrode 50 is not changed. Therefore, a capacitance value of the touch display device 2 is not further varied, and the touch control only performs a touch feedback response and does not perform a pressure feedback response. The touch display device 2 further includes a cover plate 92 and a touch display module 94 disposed above the patterned organic protective layer 90.

Figure 6:
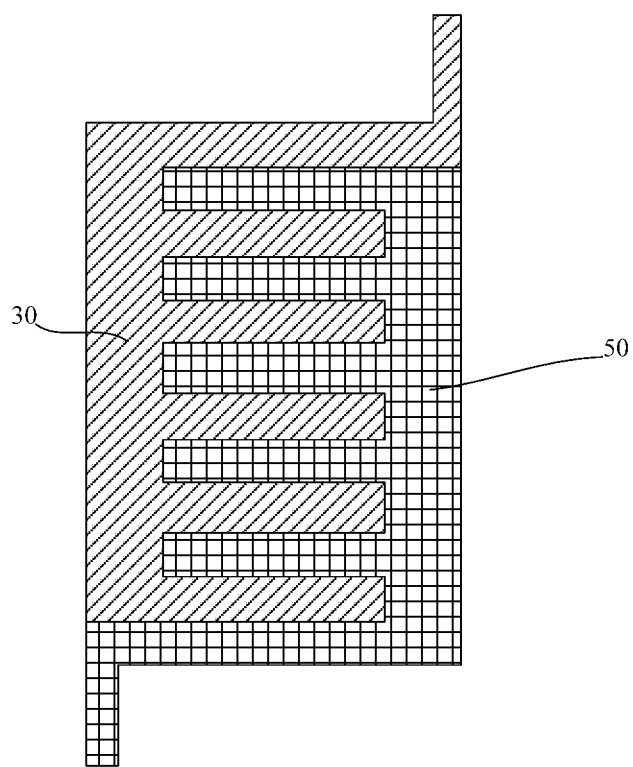
FIG. 6 is a partial enlarged schematic view of a touch driving electrode and a touch sensing electrode of the touch display device according to a second embodiment of the present invention.

FIG. 6 is a schematic view of a touch driving electrode and a touch sensing electrode of the touch display device 2 according to a second embodiment of the present invention. The touch driving electrode 30 is disposed on the patterned first transparent substrate 40, and the touch sensing electrode 50 is disposed on the non-patterned second transparent substrate 60. The touch driving electrode 30 and the touch sensing electrode 50 are matched with each other so as to present as a zigzag structure. Optionally, the touch driving electrode 30 may be disposed on the non-patterned first transparent substrate 40, and the touch sensing electrode 50 may be disposed on the patterned second transparent substrate 60. In this regard, it is obvious to those skilled in the art to adjust the embodiment of the present invention.

Accordingly, the touch display device provided by the embodiments of the present invention can simultaneously detect the pressure and a touch action, and it does not need to have a pressure sensing module. A total manufacturing cost is reduced, and a thickness of the touch display device is reduced, too. Therefore, quality and function of the touch display device are improved, and a touch sensing device integrated with a pressure sensor and a touch sensor is achieved.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A touch display device, comprising:
   a substrate;
   a liner layer disposed on the substrate;
   a first transparent substrate disposed on the liner layer;
   a second transparent substrate disposed on the liner layer; and
   a touch electrode, wherein the touch electrode comprises a touch driving electrode and a touch sensing electrode, and the touch driving electrode is disposed on the first transparent substrate, and the touch sensing electrode is disposed on the second transparent substrate, wherein a capacitance between the touch driving electrode and the touch sensing electrode is varied to perform touch sensing when touch control is applied;
   wherein one of the first transparent substrate and the second transparent substrate is patterned; the first transparent substrate and the second transparent substrate move to each other to change a distance between the touch driving electrode and the touch sensing electrode when a certain pressure is applied to the touch display device; and the capacitance between the touch driving electrode and the touch sensing electrode is varied to perform pressure sensing.

2. The touch display device according to claim 1, further comprising a cover plate.

3. The touch display device according to claim 1, wherein the first transparent substrate is a patterned first transparent substrate and the patterned first transparent substrate comprises a plurality of cylindrical bodies.

4. The touch display device according to claim 1, wherein the second transparent substrate is a patterned second transparent substrate and the patterned first transparent substrate comprises a plurality of cylindrical bodies.

5. The touch display device according to claim 1, wherein the first transparent substrate and the second transparent substrate each are made of polyimide.

6. The touch display device according to claim 1, wherein the liner layer comprises silicon dioxide.

7. The touch display device according to claim 1, further comprising an insulating layer, a metal bridge, and an organic protective layer, wherein the insulating layer comprises silicon nitride or silicon oxide.

8. The touch display device according to claim 7, wherein the insulating layer is disposed above the touch driving electrode and the touch sensing electrode, the metal bridge is disposed above the insulating layer, and an organic protective layer is disposed above the metal bridge and covers the insulating layer.

9. The touch display device according to claim 8, wherein the metal bridge connects with adjacent touch driving electrode.

10. The touch display device according to claim 1, wherein there is a predetermined distance between the touch driving electrode and the touch sensing electrode.

11. A touch display device, comprising:
a substrate;
a liner layer disposed on the substrate, wherein the liner layer comprises silicon dioxide;
a first transparent substrate disposed on the liner layer, wherein the first transparent substrate is made of polyimide;
a second transparent substrate disposed on the liner layer, wherein the second transparent substrate is made of polyimide; and
a touch electrode, wherein the touch electrode comprises a touch driving electrode and a touch sensing electrode, and the touch driving electrode is disposed on the first transparent substrate, and the touch sensing electrode is disposed on the second transparent substrate, wherein a capacitance between the touch driving electrode and the touch sensing electrode is varied to perform touch sensing when touch control is performed;

wherein one of the first transparent substrate and the second transparent substrate is patterned, and the first transparent substrate and the second transparent substrate move to each other to change a distance between the touch driving electrode and the touch sensing electrode when a certain pressure is applied to the touch display device, and the capacitance between the touch driving electrode and the touch sensing electrode is varied to perform pressure sensing.

12. The touch display device according to claim 11, further comprising a cover plate.

13. The touch display device according to claim 11, wherein the first transparent substrate is a patterned first transparent substrate, and the patterned first transparent substrate comprises a plurality of cylindrical bodies.

14. The touch display device according to claim 11, wherein the second transparent substrate is a patterned second transparent substrate and the patterned first transparent substrate comprises a plurality of cylindrical bodies.

15. The touch display device according to claim 11, further comprising an insulating layer, a metal bridge, and an organic protective layer, wherein the insulating layer comprises silicon nitride or silicon oxide.

16. The touch display device according to claim 15, wherein the insulating layer is disposed above the touch driving electrode and the touch sensing electrode, the metal bridge is disposed above the insulating layer, and an organic protective layer is disposed above the metal bridge and covers the insulating layer.

17. The touch display device according to claim 16, wherein the metal bridge connects with an adjacent touch driving electrode.

18. The touch display device according to claim 11, wherein there is a predetermined distance between the touch driving electrode and the touch sensing electrode.

* * * * *